United States Patent
Pride

[11] Patent Number: 6,116,633
[45] Date of Patent: Sep. 12, 2000

[54] COMBINATION BALL AND PIN TRAILER HITCH

[76] Inventor: William J. Pride, Rte. 6, Box 293D, Fairmont, W. Va. 26554-9136

[21] Appl. No.: 09/220,952

[22] Filed: Dec. 24, 1998

[51] Int. Cl.[7] ....................................................... B60D 1/07
[52] U.S. Cl. ...................... 280/511; 280/416.1; 280/515
[58] Field of Search ................................ 280/511, 415.1, 280/416.1, 515

[56] References Cited

U.S. PATENT DOCUMENTS

| | | | |
|---|---|---|---|
| 2,911,233 | 11/1959 | Riddle | 280/415 |
| 4,456,279 | 6/1984 | Dirck | 280/415 |
| 5,044,652 | 9/1991 | Brisson | 280/416.1 |
| 5,135,247 | 8/1992 | Alfaro et al. | 280/415.1 |
| 5,158,316 | 10/1992 | Hutchmacher | 280/415.1 |
| 5,322,313 | 6/1994 | Schroeder | 280/416.1 |
| 5,560,630 | 10/1996 | Phares et al. | 280/416.1 |
| 5,857,693 | 1/1999 | Clark, Jr. | 280/415.1 |
| 5,915,714 | 6/1999 | Bell et al. | 280/456.1 |

*Primary Examiner*—J. J. Swann
*Assistant Examiner*—J. Allen Shriver

[57] ABSTRACT

A combination ball and pin trailer hitch for permitting connection to a trailer tongue with either a ball hitch or a pin hitch. The combination ball and pin trailer hitch includes a plate with top and bottom faces, a plurality of side edges, and plurality of corners. The plate has a plurality of bores therethrough extending between the top and bottom faces of the plate. Each of the bores of the plate is positioned adjacent an associated corner of the plate. The plate also has a spaced apart pair of holes therethrough extending between top and bottom faces of the plate. An elongate threaded portion of an attachment bolt is extended through a first of the bores of the plate. A threaded portion of a ball hitch is inserted through another of the bores of the plate. An elongate portion of a pin is inserted through one of the holes of the plate.

10 Claims, 2 Drawing Sheets

COMBINATION BALL AND PIN TRAILER HITCH

BACKGROUND OF THE INVENTION

1. Field of the Invention

The present invention relates to trailer hitches and more particularly pertains to a new combination ball and pin trailer hitch for permitting connection to a trailer tongue with either a ball hitch or a pin hitch.

2. Description of the Prior Art

The use of trailer hitches is known in the prior art. More specifically, trailer hitches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,560,630 by Phares et al.; U.S. Pat. No. 5,044,652 by Brisson; U.S. Pat. No. 4,456,279 by Dirck; U.S. Pat. No. 2,911,233 by Riddle; U.S. Pat. No. 2,872,213 by Hosford; and U.S. Pat. No. Des. 379,608 by Rodriguez.

While these devices fulfill their respective, particular objectives and requirements, the aforementioned patents do not disclose a new combination ball and pin trailer hitch. The inventive device includes a plate with top and bottom faces, a plurality of side edges, and plurality of corners. The plate has a plurality of bores therethrough extending between the top and bottom faces of the plate. Each of the bores of the plate is positioned adjacent an associated corner of the plate. The plate also has a spaced apart pair of holes therethrough extending between top and bottom faces of the plate. An elongate threaded portion of an attachment bolt is extended through a first of the bores of the plate. A threaded portion of a ball hitch is inserted through another of the bores of the plate. An elongate portion of a pin is inserted through one of the holes of the plate.

In these respects, the combination ball and pin trailer hitch according to the present invention substantially departs from the conventional concepts and designs of the prior art, and in so doing provides an apparatus primarily developed for the purpose of permitting connection to a trailer tongue with either a ball hitch or a pin hitch.

SUMMARY OF THE INVENTION

In view of the foregoing disadvantages inherent in the known types of trailer hitches now present in the prior art, the present invention provides a new combination ball and pin trailer hitch construction wherein the same can be utilized for permitting connection to a trailer tongue with either a ball hitch or a pin hitch.

The general purpose of the present invention, which will be described subsequently in greater detail, is to provide a new combination ball and pin trailer hitch apparatus and method which has many of the advantages of the trailer hitches mentioned heretofore and many novel features that result in a new combination ball and pin trailer hitch which is not anticipated, rendered obvious, suggested, or even implied by any of the prior art trailer hitches, either alone or in any combination thereof.

To attain this, the present invention generally comprises a plate with top and bottom faces, a plurality of side edges, and plurality of corners. The plate has a plurality of bores therethrough extending between the top and bottom faces of the plate. Each of the bores of the plate is positioned adjacent an associated corner of the plate. The plate also has a spaced apart pair of holes therethrough extending between top and bottom faces of the plate. An elongate threaded portion of an attachment bolt is extended through a first of the bores of the plate. A threaded portion of a ball hitch is inserted through another of the bores of the plate. An elongate portion of a pin is inserted through one of the holes of the plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination ball and pin trailer hitch apparatus and method which has many of the advantages of the trailer hitches mentioned heretofore and many novel features that result in a new combination ball and pin trailer hitch which is not anticipated, rendered obvious, suggested, or even implied by any of the prior art trailer hitches, either alone or in any combination thereof.

It is another object of the present invention to provide a new combination ball and pin trailer hitch which may be easily and efficiently manufactured and marketed.

It is a further object of the present invention to provide a new combination ball and pin trailer hitch which is of a durable and reliable construction.

An even further object of the present invention is to provide a new combination ball and pin trailer hitch which is susceptible of a low cost of manufacture with regard to both materials and labor, and which accordingly is then susceptible of low prices of sale to the consuming public, thereby making such combination ball and pin trailer hitch economically available to the buying public.

Still yet another object of the present invention is to provide a new combination ball and pin trailer hitch which provides in the apparatuses and methods of the prior art some of the advantages thereof, while simultaneously overcoming some of the disadvantages normally associated therewith.

Still another object of the present invention is to provide a new combination ball and pin trailer hitch for permitting connection to a trailer tongue with either a ball hitch or a pin hitch.

Yet another object of the present invention is to provide a new combination ball and pin trailer hitch which includes a plate with top and bottom faces, a plurality of side edges, and plurality of corners. The plate has a plurality of bores therethrough extending between the top and bottom faces of the plate. Each of the bores of the plate is positioned adjacent an associated corner of the plate. The plate also has a spaced apart pair of holes therethrough extending between top and bottom faces of the plate. An elongate threaded portion of an attachment bolt is extended through a first of the bores of the plate. A threaded portion of a ball hitch is inserted through another of the bores of the plate. An elongate portion of a pin is inserted through one of the holes of the plate.

Still yet another object of the present invention is to provide a new combination ball and pin trailer hitch that lets a user keep two styles of hitches on their vehicle so that the user has the flexibility in towing trailers with various styles of trailer tongues without having to replace their vehicle's hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
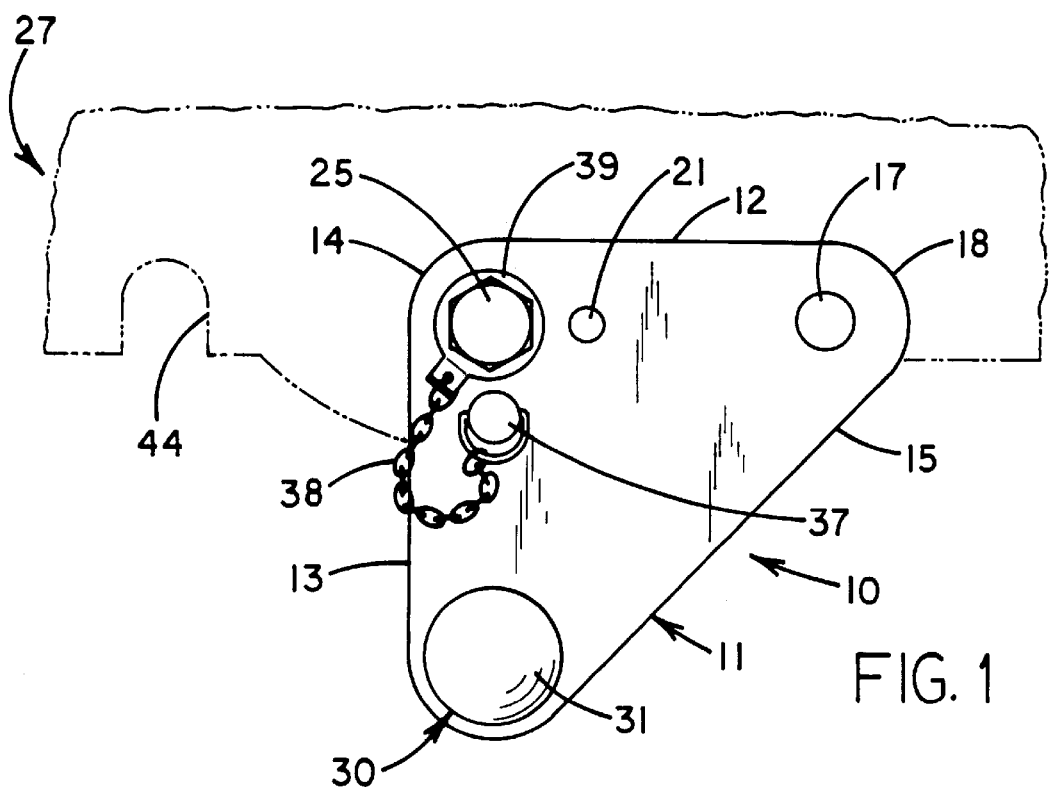
FIG. 1 is a schematic top view of a new combination ball and pin trailer hitch in a first pivot position according to the present invention.
Figure 2:
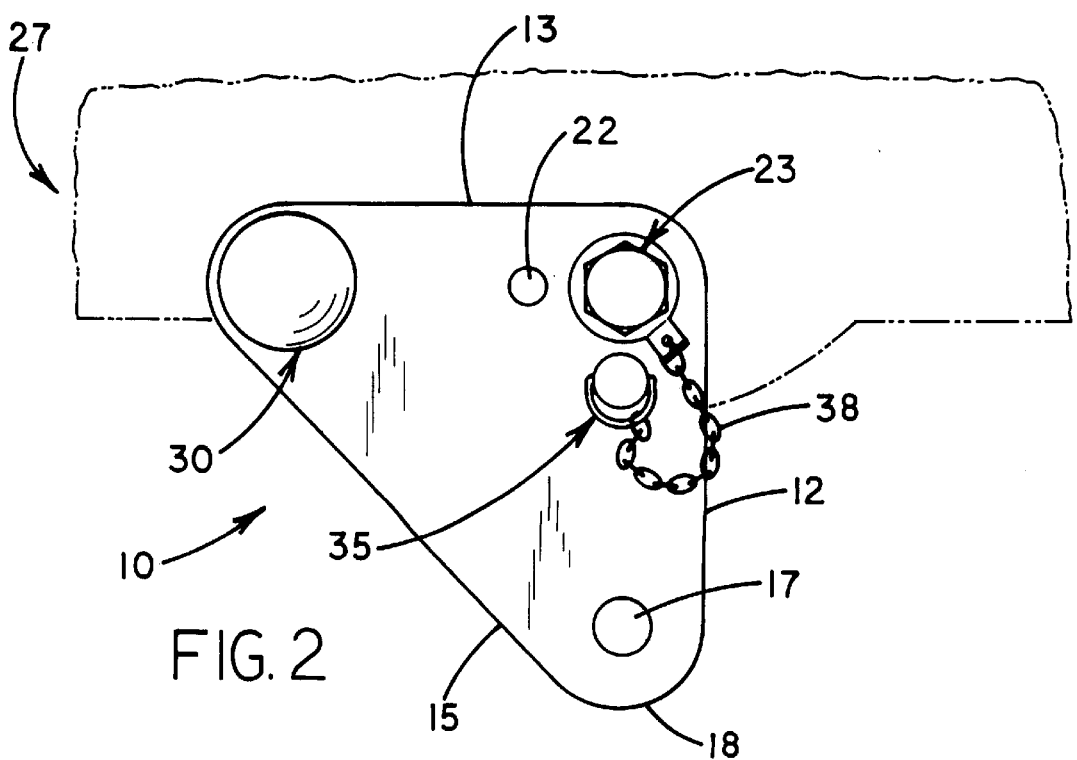
FIG. 2 is a schematic top view of the present invention second pivot position.
Figure 3:
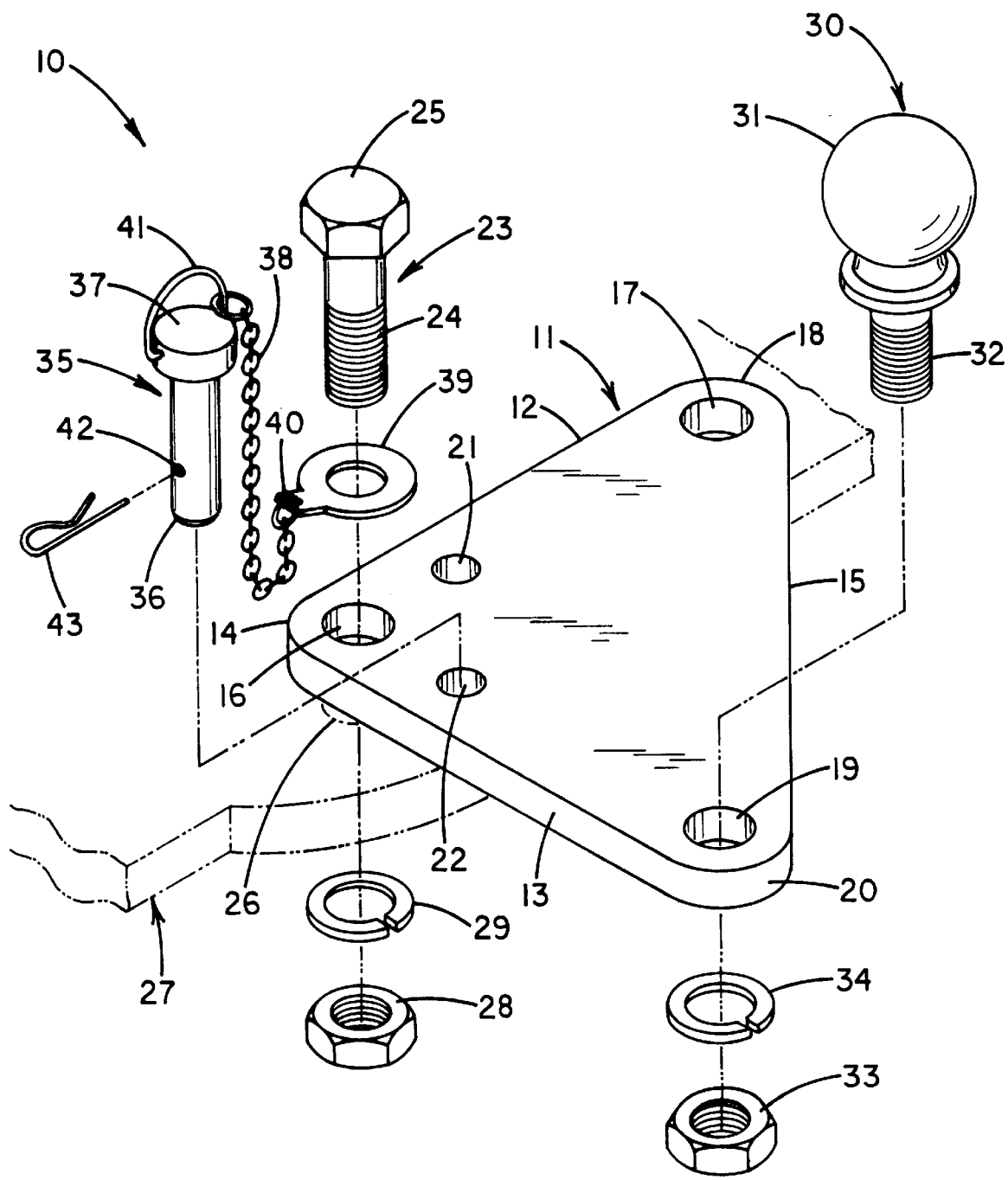
FIG. 3 is a schematic exploded perspective view of the present invention.

With reference now to the drawings, and in particular to FIGS. 1 through 3 thereof, a new combination ball and pin trailer hitch embodying the principles and concepts of the present invention and generally designated by the reference numeral 10 will be described.

As best illustrated in FIGS. 1 through 3, the combination ball and pin trailer hitch 10 generally comprises a plate with top and bottom faces, a plurality of side edges, and plurality of corners. The plate has a plurality of bores therethrough extending between the top and bottom faces of the plate. Each of the bores of the plate is positioned adjacent an associated corner of the plate. The plate also has a spaced apart pair of holes therethrough extending between top and bottom faces of the plate. An elongate threaded portion of an attachment bolt is extended through a first of the bores of the plate. A threaded portion of a ball hitch is inserted through another of the bores of the plate. An elongate portion of a pin is inserted through one of the holes of the plate.

In closer detail, the hitch 10 comprises a generally triangular plate 11 having generally triangular and substantially planar top and bottom faces, three generally straight side edges, and three generally rounded corners. A first 12 and a second 13 of the side edges of the plate converge together at a first 14 of the corners of the plate. The first and second side edges of the plate are preferably extended substantially perpendicular to one another. Ideally, the first and second side edges of the plate have generally equal lengths to one another. In an ideal illustrative embodiment, a third 15 of the side edges of the plate has a length of about 10 inches.

The plate has three generally cylindrical bolt bores therethrough extending between the top and bottom faces of the plate. Each of the bores of the plate is positioned adjacent an associated corner of the plate. Specifically, a first 16 of the bores is positioned adjacent the first corner of the plate, a second 17 of the bores is positioned adjacent a second 18 of the corners of the plate, and a third 19 of the bores is positioned adjacent a third 20 of the corners of the plate. Preferably, the first and second bores have centers lying along a first line, the first and third bores have centers lying along a second line, and the second and third bores have centers lying along a third line. In this preferred embodiment, the first and second lines are extended substantially perpendicular to one another.

The plate also has a spaced apart pair of generally cylindrical pin holes therethrough extending between top and bottom faces of the plate. A first 21 of the holes of the plate is positioned adjacent the first side edge of the plate and a second 22 of the holes of the plate is positioned adjacent the second edge of the plate. The first and second holes of the plate each are positioned closer towards the first bore of the plate than to the second and thirds bores of the plate respectfully. The first hole of the plate preferably has a center lying along the first line so that the centers of the first hole and the first and second bores are collinear with one another. Similarly, the second hole of the plate preferably has a center lying along the second line so that the centers of the first hole and the first and third bores are collinear with one another.

The bores and the holes of the plate each have a diameter with the diameters of the bores being about equal to one another and the diameters of the holes being about equal to one another. The diameter of each hole is each less than the diameter of each of the bores. In an ideal illustrative embodiment, each of the bores of the plate has a diameter of about ¾ inch and the holes each have a diameter of about 13/32 inch.

A threaded attachment bolt 23 is provided having an elongate threaded portion 24 and a hexagonal shaped head portion 25. The threaded portion of the attachment bolt is extended through the first bore of the plate such that the head portion of the attachment bolt upwardly extends from the top face of the plate. The threaded portion of the attachment bolt is threadably inserted into a threaded hitch receiving hole 26 of a vehicle 27 such that the plate is pivotally coupled to the vehicle to permit pivoting of the plate about a pivot axis at the attachment bolt. Preferably, a first threaded nut 28 and washer 29 are threadedly disposed around the threaded portion of the attachment bolt. The plate and the hitch receiving hole of the vehicle are positioned between the head portion and the first threaded nut and washer to pivotally couple the plate to the vehicle at the hitch receiving hole of the vehicle.

A ball hitch 30 is provided having a generally spherical ball portion 31 and an elongate threaded portion 32 outwardly extending from the ball portion. The threaded portion of the ball hitch is inserted through the third bore of the plate such that the ball portion of the ball hitch upwardly extends from the top face of the plate. Alternatively, the threaded portion may also be inserted into the second bore of the plate to suit the needs of the user. A second threaded nut 33 and washer 34 are threadedly disposed around the threaded portion of the ball hitch with the plate positioned between the ball portion of the ball hitch and the second threaded nut and washer to couple the ball hitch to the plate.

A pin 35 is provided having an elongate portion 36 and a generally disk-shaped head portion 37. The elongate portion of the pin is inserted through one of the holes of the plate such that the head portion of the pin upwardly extends from the top face of the plate. Preferably, a flexible elongate member 38 connects the head portion of the pin to the attachment bolt. Ideally, the elongate member comprises a chain.

The elongate member has a pair of opposite ends. An annular collar 39 is rotatably disposed around the threaded portion of attachment bolt and positioned between the head portion of the attachment bolt and the top face of the plate. The collar preferably has a generally rectangular tab 40 outwardly extending therefrom. A first of the ends of the elongate member is coupled to the tab of t he collar. The head portion of the pin has a generally U-shaped pull 41 pivotally coupled thereto. A second of the ends of the elongate m ember is coupled to the pull of the pin.

Preferably, the elongate portion of the pin has a lateral bore 42 extending therethrough. The lateral bore is positioned beneath the bottom face of the plate when the elongate portion of pin is extended th rough one of the hole s of the plate . A cotter pin 43 is extended through the lateral bore of the elongate portion of the pin such that the plate is positioned between the head portion of the pin and the cotter pin to couple the pin to the plate.

In use, the plate is pivotable with respect to the vehicle between first and second pivot positions. As illustrated in FIG. 1, the second side edge of the plate outwardly extends generally perpendicularly from the vehicle and the second corner of the plate is positioned adjacent the vehicle when the plate is positioned in the first pivot position. As illustrated in FIG. 2, the first side edge of the plate outwardly extends generally perpendicularly from the vehicle and the third corner of the plate is positioned adjacent the vehicle when the plate is positioned in the first pivot position. The pin is extended through the second hole of the plate when the plate is positioned in the first pivot position as illustrated in FIG. 1. Conversely, the pin is extended through the first hole of the plate when the plate is positioned in the second pivot position as illustrated in FIG. 2.

Preferably, the vehicle has a generally U-shaped notch 44 positioned to one side of the hitch receiving hole of the vehicle. In use, the notch of the vehicle receives therein a portion of the threaded portion of the ball hitch when the plate is positioned in the second pivot position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch for attachment to a vehicle, comprising:
    a plate having top and bottom faces, a plurality of side edges, and plurality of corners;
    said plate having a plurality of bores therethrough extending between said top and bottom faces of said plate;
    each of said bores of said plate being positioned adjacent an associated corner of said plate;
    said plate having a spaced apart pair of holes therethrough extending between top and bottom faces of said plate and positioned towards a first of said bores of said plate;
    an attachment bolt having an elongate threaded portion and a head portion, said threaded portion of said attachment bolt being extended through said first bore of said plate;
    a ball hitch having a ball portion and an elongate threaded portion;
    said threaded portion of said ball hitch being inserted through one of said bores of said plate;
    a pin having an elongate portion and a head portion;
    said elongate portion of said pin being inserted through one of said holes of said plate;
    wherein said first bore is positioned adjacent said first corner of said plate, a second of said bores being positioned adjacent a second of said corners of said plate, and a third of said bores being positioned adjacent a third of said corners of said plate, said threaded portion of said ball hitch being extended through said third bore of said plate; and
    wherein said first and second holes of said plate each are positioned closer towards a first bore of said plate than to a second and third bores of said plate respectfully such that said pin inserted through said first hole locks said plate into a first pivot position whereby said plate is adapted for receiving a hitch pin of a hitch, said pin being inserted through said second hole such that said plate is locked into a second pivot position whereby said plate is adapted for receiving a ball hitch receiver of the hitch.

2. The hitch of claim 1, wherein a plate is generally triangular in shape such that said plurality of side edges comprises three side edges and said plurality of corners comprises three corers.

3. The hitch of claim 2, wherein a first and a second of said side edges of said plate converge together at a first of said corners of said plate, said first and second side edges of said plate being extended substantially perpendicular to one another.

4. The hitch of claim 3, wherein said first and second side edges of said plate having generally equal lengths to one another.

5. The hitch of claim 1, wherein said first and second bores have centers lying along a first line, said first and third bores have centers lying along a second line, said second and third bores have centers lying along a third line, and said first and second lines are extended substantially perpendicular to one another.

6. The hitch of claim 5, wherein said first of said holes of said plate is positioned adjacent said first side edge of said plate, wherein said second of said holes of said plate is positioned adjacent said second edge of said plate, wherein said first hole of said plate has a center lying along said first line such that said centers of said first hole and said first and second bores are collinear with one another, and wherein said second hole of said plate has a center lying along said second line such that said centers of said second hole and said first and third bores are collinear with one another.

7. The hitch of claim 1, wherein said bores and said holes of said plate each have a diameter, and wherein said diameters of said holes are each less than said diameter of at least one of said bores.

8. The hitch of claim 1, further comprising a flexible elongate member connecting said head portion of said pin to said attachment bolt.

9. The hitch of claim 8, wherein said elongate member has a pair of opposite ends, wherein an annular collar is rotatably disposed around said threaded portion of attachment bolt, wherein a first of said ends of said elongate member is coupled to said collar, wherein a second of said ends of said elongate member is coupled to said pin.

10. A hitch system, comprising:

a plate being generally triangular in shape and having generally triangular substantially planar top and bottom faces, three generally straight side edges, and three generally rounded corners;

a first and a second of said side edges of said plate converging together at a first of said corners of said plate;

said first and second side edges of said plate being extended substantially perpendicular to one another;

wherein said first and second side edges of said plate having generally equal lengths to one another;

said plate having three generally cylindrical bores therethrough extending between said top and bottom faces of said plate;

each of said bores of said plate being positioned adjacent an associated corner of said plate;

a first of said bores being positioned adjacent said first corner of said plate, a second of said bores being positioned adjacent a second of said corners of said plate, and a third of said bores being positioned adjacent a third of said corners of said plate;

said first and second bores having centers lying along a first line, said first and third bores having centers lying along a second line, said second and third bores having centers lying along a third line;

said first and second lines being extended substantially perpendicular to one another;

said plate having a spaced apart pair of generally cylindrical holes therethrough extending between top and bottom faces of said plate;

a first of said holes of said plate being positioned adjacent said first side edge of said plate, a second of said holes of said plate being positioned adjacent said second edge of said plate;

said first hole of said plate having a center lying along said first line such that said centers of said first hole and said first and second bores are collinear with one another;

said second hole of said plate having a center lying along said second line such that said centers of said second hole and said first and third bores are collinear with one another;

said first and second holes of said plate each being positioned closer towards said first bore of said plate than to said second and thirds bores of said plate respectfully;

said bores and said holes of said plate each having a diameter, said diameters of said bores being about equal to one another, said diameters of said holes being about equal to one another and less than said diameter of at least one of said bores;

a threaded attachment bolt having an elongate threaded portion and a hexagonal shaped head portion, said threaded portion of said attachment bolt being extended through said first bore of said plate such that said head portion of said attachment bolt upwardly extends from said top face of said plate;

said threaded portion of said attachment bolt being threadably inserted into a threaded hitch receiving hole of a vehicle such that said plate is pivotally coupled to the vehicle to permit pivoting of said plate about a pivot axis at said attachment bolt;

a first nut and washer being disposed around said threaded portion of said attachment bolt, said plate and the hitch receiving hole of the vehicle being positioned between said head portion and said first nut and washer;

a ball hitch having a generally spherical ball portion and an elongate threaded portion outwardly extending from said ball portion;

said threaded portion of said ball hitch being inserted through said third bore of said plate such that said ball portion of said ball hitch upwardly extends from said top face of said plate;

a second nut and washer being disposed around said threaded portion of said ball hitch, said plate being positioned between said ball portion of said ball hitch and said second nut and washer;

a pin having an elongate portion and a generally disk-shaped head portion;

said elongate portion of said pin being inserted through one of said holes of said plate such that said head portion of said pin upwardly extends from said top face of said plate;

a flexible elongate member connecting said head portion of said pin to said attachment bolt, wherein said elongate member comprises a chain;

said elongate member having a pair of opposite ends;

an annular collar being rotatably disposed around said threaded portion of attachment bolt and positioned between said head portion of said attachment bolt and said top face of said plate;

said collar having a generally rectangular tab outwardly extending therefrom;

a first of said ends of said elongate member being coupled to said tab of said collar;

said head portion of said pin having a generally U-shaped pull pivotally coupled thereto, a second of said ends of said elongate member being coupled to said pull of said pin;

said elongate portion of said pin having a lateral bore extending therethrough, said lateral bore being positioned beneath said bottom face of said plate;

a cotter pin being extended through said lateral bore of said elongate portion of said pin such that said plate is positioned between said head portion of said pin and said cotter pin;

said plate having first and second pivot positions;

said second side edge of said plate outwardly extending generally perpendicularly from the vehicle and said second corner of said plate being positioned adjacent the vehicle when said plate is positioned in said first pivot position;

said first side edge of said plate outwardly extending generally perpendicularly from the vehicle and said third corner of said plate being positioned adjacent the vehicle when said plate is positioned in said second pivot position;

said pin being extended through said second hole of said plate when said plate is positioned in said first pivot position, said pin being extended through said first hole of said plate when said plate is positioned in said second pivot position; and the vehicle having a generally U-shaped notch positioned to one side of the hitch receiving hole of the vehicle, the notch of the vehicle receiving therein a portion of said threaded portion of said ball hitch when said plate is positioned in said second pivot position.

\* \* \* \* \*